United States Patent [19]
Auger

[11] Patent Number: 5,547,006
[45] Date of Patent: Aug. 20, 1996

[54] ROLL-UP CELLULAR SHADES

[75] Inventor: Raymond N. Auger, Aspen, Colo.

[73] Assignee: Hunter Douglas Inc., Upper Saddle River, N.J.

[21] Appl. No.: 58,162

[22] Filed: May 4, 1993

[51] Int. Cl.⁶ .................................................... E06B 9/06
[52] U.S. Cl. .................... 160/84.01; 160/121.1; 160/238
[58] Field of Search .................. 160/84.1 D, 84.1 C, 160/84.1 R, 238, 87, 89, 121.1, 107; 156/204; 428/188

[56] References Cited

U.S. PATENT DOCUMENTS

| | | | |
|---|---|---|---|
| 1,937,342 | 11/1933 | Higbie | 160/84.1 D X |
| 2,140,049 | 12/1938 | Grauel | 160/121.1 |
| 2,874,612 | 2/1959 | Luboshez | 160/238 X |
| 3,487,875 | 1/1970 | Shukat et al. | |
| 4,019,554 | 4/1977 | Rasmussen | 160/84 R |
| 4,194,550 | 3/1980 | Hopper | 160/25 |
| 4,677,013 | 6/1987 | Anderson | 428/116 |
| 4,907,635 | 3/1990 | Bunger | 160/84.1 |
| 4,943,454 | 7/1990 | Neff | 160/84.1 C |
| 5,104,469 | 4/1992 | Colson | 160/84.1 D |
| 5,129,440 | 7/1992 | Colson | 160/84.1 |
| 5,158,632 | 10/1992 | Colson et al. | |

*Primary Examiner*—Blair M. Johnson
*Attorney, Agent, or Firm*—Gary M. Polumbus; Holland & Hart LLP

[57] ABSTRACT

A window shade comprising a base sheet-like material, such as a fabric, (1) which hangs vertically from a roller and to which is attached, by parallel narrow attachment means at intervals, a second sheet-like material of a decorative character (3) which is longer between its attachments (2) to the first material (1). If there is sufficiently excess decorative material (3) between lines of attachment (2), it folds twice between lines of attachment (2) when such a shade is rolled up. When the shade unrolls, the decorative material (3) flexes out from the base material (1) because of its greater length and forms an air-filled cell. Vertically arranged strips of these cells (18) may be formed on a single base sheet, with each strip unique in various ways to obtain a decorative effect. The shades may also be made of strips of material running the width of the shade. Decorative material which does not crease or fold tightly may be attached to the face of flexible material on a cell-by-cell basis. Variations in the dimensions of groups of cells can cause them to create decorative patterns of different types when they are viewed collectively.

14 Claims, 3 Drawing Sheets

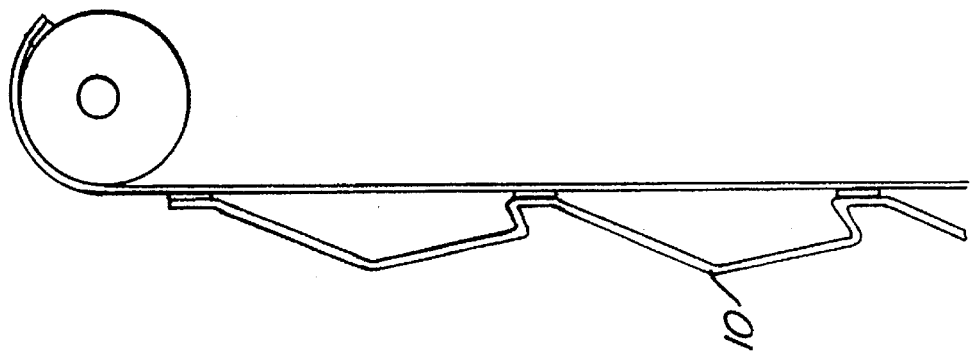
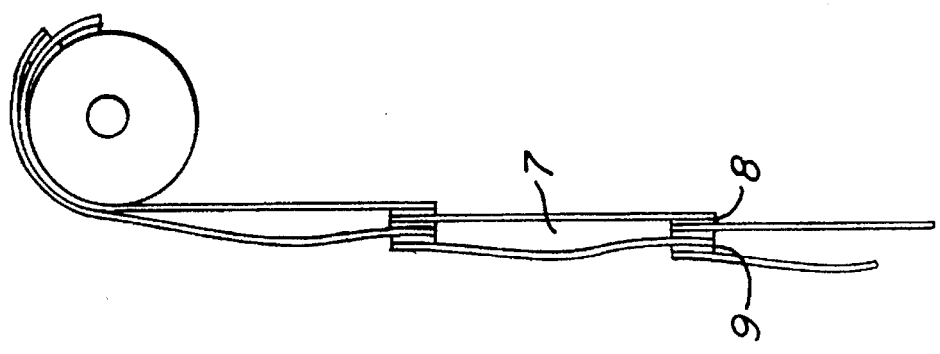
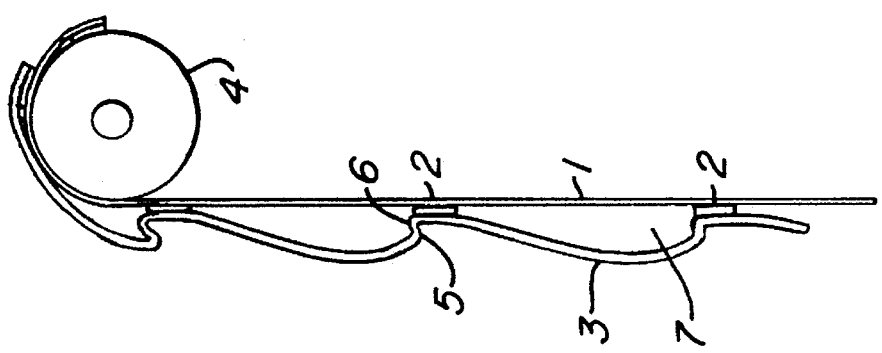

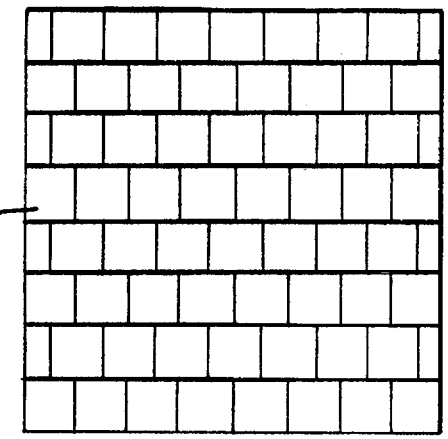
Fig_6
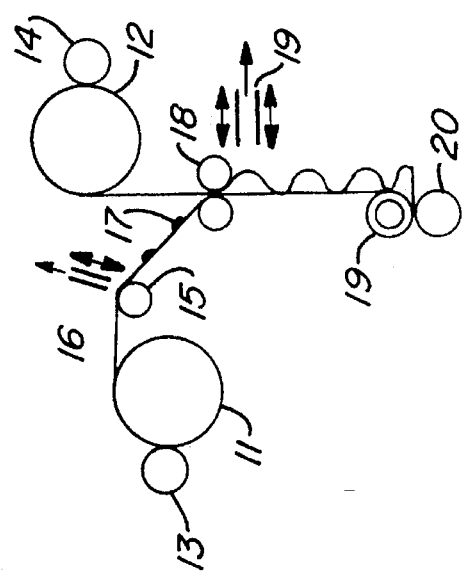
Fig_5
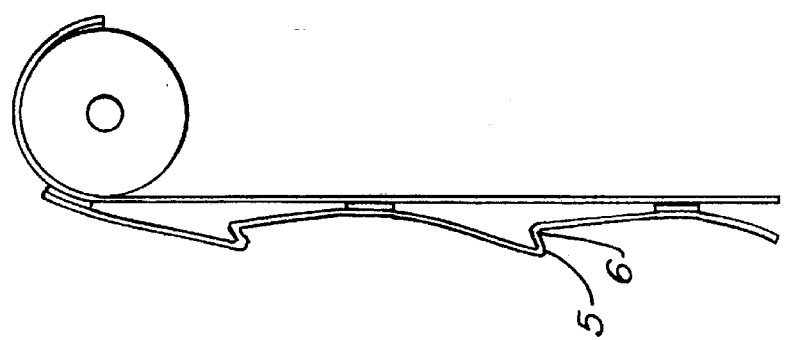
Fig_4

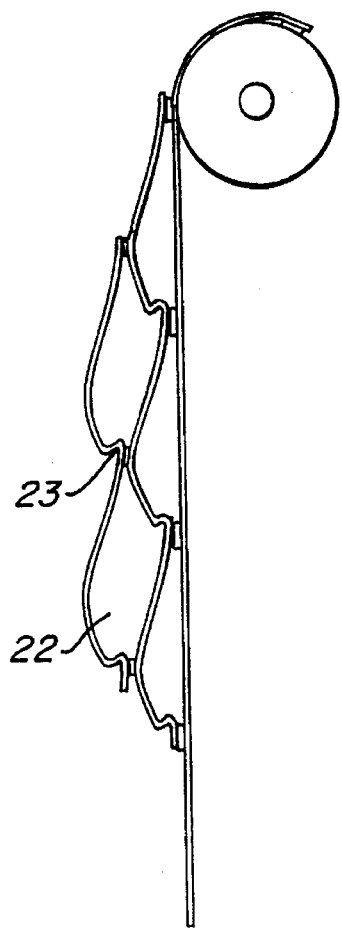
Fig_7
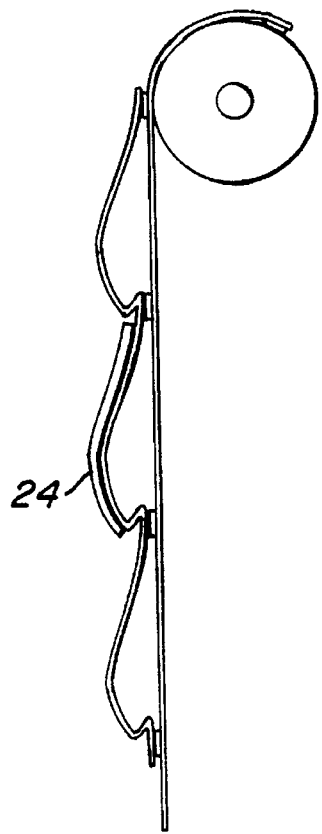
Fig_8
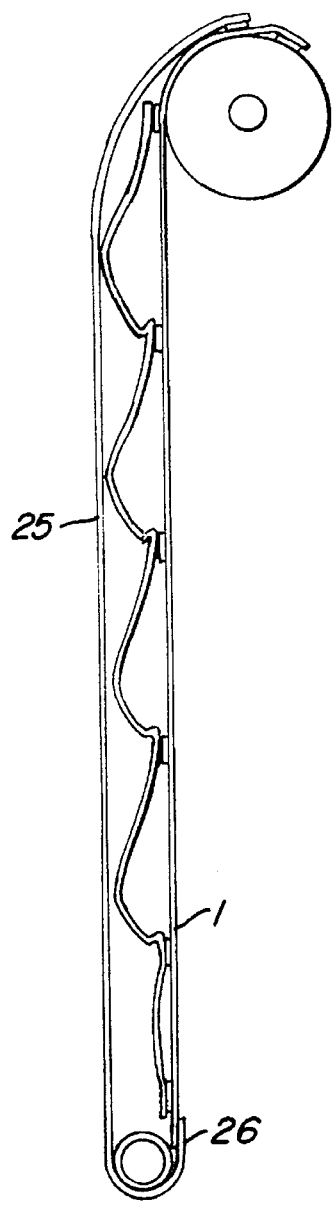
Fig_9

ROLL-UP CELLULAR SHADES

BACKGROUND—FIELD OF THE INVENTION

This invention relates to window coverings, specifically those with a roll-up cellular structure.

BACKGROUND—PRIOR ART

Window shades composed of multiple layers of fabric arranged to create pockets of still air in their structure are commonly described as cellular shades. Among the better-known of these is described by Thomas P. Hopper in U.S. Pat. No. 4,194,550 of Mar. 25, 1980, which is a continuation-in-part of U.S. Pat. No. 4,039,019, of Jan. 26, 1976.

Hopper's widely-publicized invention had as its central function the creation of a highly-insulating shade. However, for various reasons, it did not become commercially successful. On the other hand, Max Rasmussen, in U.S. Pat. No. 4,019,554, of Apr. 26, 1977, described a "Thermally insulating curtain, especially for greenhouses" which has become commercially very successful, not so much for its utilitarian thermal characteristics as for its appearance. While his shade can be, in theory, rolled up, its design clearly intends it to be raised by accordion folding its fabric. Rolling such a shade would create folds in places not shown by his drawings.

Cellular shade designs to follow, such as Anderson's U.S. Pat. No. 4,677,013 of Jun. 30, 1987, Colson's U.S. Pat. No. 5,158,632 of Oct. 27, 1992, and his U.S. Pat. No. 5,129,440 of Jul. 14, 1992, show cellular shades that fold up. Folding shades pulled up by cords are in the general category of Roman shades. Some inventors have used rollers to wrap of the cords of Roman shades to obtain the benefits of roller operation of a folding device. H. ShuKat et al, in U.S. Pat. No. 3,487,875, of Jan. 6, 1970, is one example of this approach.

While the insulating capability of cellular shades is highly desirable, their appearance is a clearly the most important factor in their sale. In this regard, Hopper's shade offered little, while Rasmussen's shade offered an effect which proved highly desirable to the public.

OBJECTS AND ADVANTAGES

It is an object of the presently described invention to create cellular shades which can be rolled up rather than folded up, and to give such shades a variety of visual effects by varying construction parameters. There are some unique advantages to rolling-up rather than folding-up shades. First, they are easier to motorize, as they are simply wrapped around a motorized tube. Second, the cord systems used to rotate rollers are widely, although not universally, viewed as easier to operate than the cord-lock or cord-cleat systems of folding shades. The operation of spring rollers is also very familiar to many people.

A second object of the invention is the formation of cells using as few seams and as little fabric as possible.

A third object of the invention is the creation of cells using vertical strips of fabric for the room-facing surface, with the possibility of unique cell patterns for each strip.

Another object of the invention is a cellular shade which can be given a wide variety of cell shapes, while being manufactured by one machine, simply by the variation of two cell dimensions.

Another object of the invention is the creation of an insulating shade which can be inexpensively manufactured.

Another object of the invention is the creation of a cellular shade which can be fabricated from large sheets of fabric or from narrow strips run vertically or horizontally.

SUMMARY OF THE INVENTION

Throughout this description of my invention the word fabric shall be used interchangeably with any type of flexible sheet material such as plastic, plastic-laminated fabric, films or foils.

This invention utilizes a base fabric to which is secured a second fabric, which is room-facing and of a decorative color. The decorative fabric is secured horizontally at intervals to the base fabric and is greater in length than the mounting fabric between intervals. When such a combination is rolled up on a cylindrical shape such as a roller, if there is sufficient excess decorative fabric in each interval, it will be creased in two places in each interval by the action of being rolled up. The relative location of one of the creases changes as the total diameter of the rolled-up fabric increases, causing each cell to have slightly unique proportions, differing from all others on a given shade, even though the lengths of fabric which compose them are the same.

Air-filled cells are created in the space between the base fabric and the decorative fabric when the shade is unrolled. By varying either or both the dimensions of the intervals and the amount of room-facing fabric between intervals, a wide variety of visual effects can be obtained. In addition, the method of manufacture may permit the two variables which determine the size and shape of the cells to be altered in the course of the assembly of one shade.

Another unique capability of the roll-up cellular shade is that the face fabric may be applied in vertical strips, with each strip given a unique cellular structure.

BRIEF DESCRIPTION OF THE DRAWINGS

FIG. 1 is an edge view elevation of the cellular shade, showing its relationship to its roller.

FIG. 2 is an edge view elevation view of the cellular shade with cells too thin to produce fabric folding when rolled up.

FIG. 3 is a variation of FIG. 1 to the extent that a decorative crease has been added.

FIG. 4 Is a side view of a few cells showing an alternate location for the folds.

FIG. 5 is a schematic representation of a machine able to make the shade shown in FIG. 1.

FIG. 6 is a frontal view of a shade made of vertical strips of cells, with the cells of adjacent strips offset.

FIG. 7 is a side view of two layers of cells, one atop the other, showing a broken out part of the top portion of a shade.

FIG. 8 is a side view of a few cells with a thick decorative material secured to the exposed surface of one cell.

FIG. 9 is a side view of cells having a free hanging fabric overlaid in front of the cells.

DETAILED DESCRIPTION OF THE INVENTION

FIG. 1 shows an edge view elevation of a typical shade made according to the present invention. The base material, 1, would normally face a window. To it is attached, 2, by adhesive, sewing or any suitable means, a decorative material, 3. This pair of materials, which may be fabrics or films, the term fabrics being used herein to apply to both, is rolled up on a roller, 4, at which time the folds 5 and 6 are made, permitting the decorative fabric, 3, to be rolled up tightly. Because the decorative fabric 3, when rolled up, is always at a greater radius from the roller than the base fabric 1, presuming the material is rolled so that the decorative fabric is always external to the base fabric, then the amount of decorative fabric between the fold 5 and the upper attachment, 2, requires that the decorative fabric 3 expand outward from the base fabric 1 when the shade is unrolled, creating an open cell, 7. The curvature set in the fabric by being rolled up also assists this process.

If the amount of decorative fabric in each interval is exactly the same as required for both fabrics to roll up without stress to either, then, when the fabrics are unrolled, a small air pocket, 7, will be created between the two fabrics, illustrated by FIG. 2. As the effective roller diameter grows with accumulating fabric on the roller, this pocket becomes thinner, becoming both thermally and decoratively inconsequential. However, if the room-facing fabric is made slightly larger than results in a perfect accommodation to being rolled up, resulting in a slight increase in effective roller diameter, the cells so created will be noticeable for a limited range of shade lengths which may satisfy some shade buyers. These unfolded cells, that is, cells so thin that there is no folding of the decorative fabric when they are rolled up, have some value in stiffening a shade fabric across its width and in giving it modest surface waviness.

FIG. 2 also illustrates a method of manufacture commonplace in pleated folding cellular shades, the assemby of the shade through the use of strips of fabric running across the width of the shade. In my invention this technique can be employed for both fabrics of the shade, as shown in FIG. 2, or for just the room-facing fabric. The attraction of this technique is that permits the construction of shades of any width. Its disadvantage is that two additional bonds, 8 and 9, are required per cell. This strip assembly method can be used for the configuration in FIG. 1, 3, 4, 7 and 8, to be discussed.

Should a shade of the type shown in FIG. 1 be rolled up "backwards", so that the decorative fabric faces the roller, the cells will be much flatter. In some cases, a flatter cell may be viewed as desirable, consequently, "reverse" rolling is a variant of the invention.

In the manufacture of the shade according to the teachings herein, the two critical dimensions are the length of the decorative fabric 3, between attachments, 2, and the length of the base fabric between these lines. By varying these two dimensions, the cells, 7, can be fat with the decorative fabric 3 highly rounded for each cell, or the cells can be nearly flat, with only a slight curvature for the decorative fabric 3.

It is possible to add decorative creases to the decorative fabric, 3. FIG. 3 shows such a crease, 10. It is also possible to relocate the creases 5 and 6 of FIG. 1 to some other point on the decorative fabric, as shown in FIG. 4. Both of the last described techniques have the effect of giving the shade the appearance of a pleated shaded, one normally folded up, whereas without the use of either technique, the rounded surface of the cells provides an effect quite different from that of pleated shades, dominated by the sharp lines of each fold.

FIG. 5 is a schematic representation of a method of manufacture. Roll of fabric 11 is the base fabric, and roll of fabric 12 the decorative fabric. The two rollers 13 and 14 represent fabric motion measuring devices, which control the intermittent feed movements of the two rolls of fabric. Rollers 15 are idlers, while the structure 16, represented as a nozzle, moves down the length of fabric applying adhesive. In the case where the fabric on roll 12 consists of strips, the adhesive 17 would be laid down intermittently to correspond to the cell pattern desired on different strips. The movement, shown by arrows, of roller 18, is for the purpose of pressing the two fabrics together wherever there is a line of adhesive. Vacuum nozzle 19 pulls any slack fabric between it and the roll 12 away from the base fabric to create a cell prior to the movement of roller 18. As the assembled shade is rolled up on roller 19, a pressure roller 20, forms the folds.

The action of the adhesive applicator, 16, is represented in highly simplified form, as those familiar with the art will understand that thermal or air-drying actions may be required to obtain proper adhesive characteristics prior to bonding the fabrics. Also understood by those familiar with the art is that a control computer, not shown, will be required to coordinate the various actions of the assembly machine, and that roller 16 will require torque control to properly roll the fabric up.

The use of sewing or heat sealing rather than adhesives to bond the fabrics together would require replacement of the rollers 12 and 14 with a sewing machine head which would traverse the width of the fabric, or a heat sealing apparatus using any of the principles employed by such devices.

The modifications of the machine need to obtain the displaced folds seen in FIG. 4 should be apparent to anyone skilled in the art. Because the folds are formed as the fabric rolls up on roller 19, it is at that point that the displacement mechanism would be most conveniently applied.

FIG. 6 is a frontal view of a shade made of vertical strips of decorative fabric with the individual cells, 21, formed in each strip offset a half cell from each other. While the drawing shows cells of identical size, they may be of variable size, just as strips of cells may be of different widths. Designs may be created by the collective appearance of the cells. For example, in a large shade made of strips of cells, those cells in the center of the shade can be composed of flatter cells than the rest of the shade, creating the image of a circle in the center of the shade. This image would result from the difference in appearance of flatter cells in contrast with fatter cells. Other images, such as squares, diagonal stripes, or flowers are also attainable in this way.

The shade in FIG. 6 may use an open mesh for the window-facing fabric, in which case it can be used for privacy in warm weather while still permitting air flow through it.

It is also understood that when a shade is made of vertical strips of cells, that a fabric change may occur at any cell by bonding a different fabric to the strip at that point, creating a change of color in a vertical direction.

FIG. 7 shows the cellular structure of FIG. 1 with a second layer of cells, 22, similar to the first layer, attached to it to improve its insulating value. Additional layers may be added in a similar manner, with the attachment lines, 23, for the new layer in the middle of the mounted cell in each case.

In this side view, which shows only a few cells at the top of a shade, it may be presumed that the second layer of cells, 22, runs the full width of the shade, or is composed of strips of the type seen in FIG. 6.

FIG. 8 shows that a decorative material, 24, such as leather or other material which is thick when folded or does not crease easily, can be bonded to the unfolded (uncreased) face of a cell, covering its visible surface. Because the limited extent to which this surface is required to flex between free-hanging and roll-up, the laminated material might be quite stiff, and outside of the category of fabrics or films: for example, a wood veneer.

Cells may be located on both sides of a base fabric, so that the cellular shape is presented towards the window as well as inside. When this is the case, however, these out-facing cells will be more flattened than interior cells of identical dimensions, as they will be rolled up facing the roller.

The ends of the cells may be sealed closed to permit them to slide in narrow tracks to improve the edge-seal of the shades in window frames.

FIG. 9 shows a free-hanging fabric, 25, attached to the roller in front of the cells, and at its bottom attached, 26, to the base fabric, 1. Air will then be trapped between this fabric and the cells, greatly improving the insulating ability of the shades. This free-hanging fabric may also be of a semi-transparent material creating an aesthetic effect in front of the cells of the shade, and need not, for thermal reasons, be attached to the bottom of the cellular shade, but may then have its own hem bar.

The thickness of the fabrics used for shades determines effective roller diameter. However, in the case of the present invention, the fold lines have two extra layers of fabric for a short distance. Were the distance between the fold lines or the attachments to exactly equal the effective circumference of the rolled up fabric which increases with each additional wrap of fabrics, it would be the case that all of the fold lines would fall atop each other, making the fabric roll eccentric in diameter. This would also be true for whole number multiples or devisors of the circumference. Because the effective circumference of the roller with fabric thereon changes with each of its revolutions, were all the cells the same height (is the distance between attachments 2), it might be the case that only three or four fold lines would fall immediately on top of each other. However, as it is desirable to avoid this effect. The way to prevent it is to prevent any cell height, when it is less than its roll circumference (that is, the effective circumference of the roller when it is added) from being a whole number divisor of the effective roll circumference. When cell height is larger than its roll circumference, its height, when divisible by a whole number, should not equal the effective roll circumference.

What I claim is:

1. A window shade comprising the combination of a roller and a first sheet secured to said roller and adapted to hang vertically from the roller in a substantially planar orientation, said roller having a predetermined circumference, a second sheet secured to the first sheet by narrow attachments along spaced parallel horizontal lines of attachment, the length of the second sheet between said attachments being greater than the length of the first sheet between the attachments such that when rolled on said roller, both sheets lie against each other but when unrolled, air spaces are created between the two sheets and the attachments, the distance between said attachments, when less than the circumference of said roller, being other than a whole number divisor of the circumference of said roller.

2. A window shade comprising the combination of a roller and a first sheet secured to said roller and adapted to hang vertically from the roller in a substantially planar orientation, said roller having a predetermined circumference, a second sheet secured to the first sheet by narrow attachments along spaced parallel horizontal lines of attachment, the length of the second sheet between said attachments being greater than the length of the first sheet between the attachments such that when rolled on said roller, both sheets lie against each other but when unrolled, air spaces are created between the two sheets and the attachments, the distance between said attachments, when greater than the circumference of said roller, being other than a whole number multiple of the circumference of said roller.

3. A window shade as in claims 1 or 2 where the means of attachment is an adhesive.

4. A window shade as in claims 1 or 2 where the means of attachment is heat-sealing.

5. A window shade as in claims 1 or 2 where the means of attachment is sewing.

6. A window shade as in claims 1 or 2 where the shade is rolled up with the second sheet outermost on the roll.

7. A window shade as in claim 1 or 2 where the shade is rolled up with the first sheet outermost on the roll.

8. A window shade as in claims 1 or 2 where the second sheet is composed of strips which are oriented vertically and attached adjacent to each other to the first sheet but not to each other.

9. A window shade as in claims 1 or 2 where the second sheet is used as a base on which to secure a decorative material which does not fold, covering only the visible parts of the second sheet.

10. A window shade as in claims 1 or 2 where the second sheet has one or more creases which is/are flattened when the shade is rolled up.

11. A window shade as in claims 1 or 2 where neither of the two folds is adjacent to the attachment line.

12. A window shade as in claims 1 or 2 wherein said first and second sheets comprise strips of sheet material oriented in the direction of the width of the shade, these strips being attached to each other along said lines of attachment so that the entire shade is composed of such strips.

13. A window shade as in claims 1 or 2 where one or more additional sheets are attached to the second sheet at second lines of attachment, each replicating the shape of the sheet to which it is attached, the second lines of attachment being located at the approximate center of the cells of sheet.

14. A window shade as in claims 1 or 2 where the length of said second sheet between attachment lines is varied within a shade to create a decorative pattern.

* * * * *

UNITED STATES PATENT AND TRADEMARK OFFICE
CERTIFICATE OF CORRECTION

PATENT NO. : 5,547,006
DATED : Aug. 20, 1996
INVENTOR(S) : Raymond N. Auger

It is certified that error appears in the above-identified patent and that said Letters Patent is hereby corrected as shown below:

Cover page  Add the following language to the cover page of the patent: --The portion of the term of this patent subsequent to May 4, 2013 has been disclaimed.--

Col. 6, line 49, (claim 13)  Before "sheet" insert --said second--.

Signed and Sealed this

Twelfth Day of May, 1998

*Attest:*

BRUCE LEHMAN

*Attesting Officer*  *Commissioner of Patents and Trademarks*